US008001070B2

(12) United States Patent
Zhang et al.

(10) Patent No.: US 8,001,070 B2
(45) Date of Patent: Aug. 16, 2011

(54) OBJECT ORIENTED RULE-BASED SYSTEM AND METHOD

(75) Inventors: Rui Zhang, Beijing (CN); Conrad Bruce Beaulieu, Duluth, MN (US); John Hajdukiewicz, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 853 days.

(21) Appl. No.: 11/957,788

(22) Filed: Dec. 17, 2007

(65) Prior Publication Data
US 2009/0157586 A1  Jun. 18, 2009

(51) Int. Cl.
G06F 17/00 (2006.01)
G06N 5/02 (2006.01)

(52) U.S. Cl. ............ 706/47; 706/45; 706/46; 706/52; 706/62

(58) Field of Classification Search .............. None
See application file for complete search history.

(56) References Cited

U.S. PATENT DOCUMENTS

| | | | |
|---|---|---|---|
| 4,849,905 A * | 7/1989 | Loeb et al. | 706/48 |
| 5,159,662 A * | 10/1992 | Grady et al. | 706/48 |
| 5,241,652 A * | 8/1993 | Barabash et al. | 706/48 |
| 5,265,193 A * | 11/1993 | Grady et al. | 706/48 |
| 6,078,911 A * | 6/2000 | Bonissone et al. | 706/52 |
| 7,433,854 B2 * | 10/2008 | Joseph et al. | 706/46 |
| 7,565,642 B2 * | 7/2009 | Moore et al. | 717/117 |
| 7,603,358 B1 * | 10/2009 | Anderson et al. | 1/1 |
| 7,853,546 B2 * | 12/2010 | Damodharan | 706/47 |
| 2004/0034848 A1 | 2/2004 | Moore et al. | 717/117 |
| 2004/0083454 A1 | 4/2004 | Bigus et al. | 717/117 |
| 2005/0154695 A1 | 7/2005 | Gonzalez et al. | 707/1 |
| 2005/0165707 A1 | 7/2005 | Rehberg et al. | 706/47 |
| 2005/0240546 A1 * | 10/2005 | Barry | 706/47 |
| 2005/0246302 A1 * | 11/2005 | Lorenz et al. | 706/47 |
| 2005/0262032 A1 * | 11/2005 | Smith | 706/47 |
| 2007/0038775 A1 | 2/2007 | Parekh et al. | 709/238 |
| 2007/0094193 A1 * | 4/2007 | Joseph et al. | 706/46 |
| 2008/0097748 A1 * | 4/2008 | Haley et al. | 704/9 |
| 2008/0147584 A1 * | 6/2008 | Buss | 706/47 |
| 2008/0222070 A1 * | 9/2008 | Damodharan | 706/47 |
| 2008/0249860 A1 * | 10/2008 | Carotta et al. | 705/14 |
| 2008/0301078 A1 * | 12/2008 | Proctor et al. | 706/47 |
| 2008/0301079 A1 * | 12/2008 | Proctor et al. | 706/47 |
| 2009/0063385 A1 * | 3/2009 | Proctor | 706/48 |

OTHER PUBLICATIONS

Doorenbos, Robert B., Production Matching for Large Learning Systems, Jan. 31, 1995; pp. 1-194.
Forgy, CL, The Rete Match Algorithm, pp. 18-37, May 1980.
Wright, I., Marshall, J., The Execution Kernel of RC++: Rete*, A Faster Rete with Treat as a Special Case; pp. 1-13.
Batory, Don, The Leaps Algorithms$_1$; pp. 1-15.

* cited by examiner

*Primary Examiner* — Omar F Fernandez Rivas
(74) *Attorney, Agent, or Firm* — Kermit D. Lopez; Luis M. Ortiz; Tuesday A. Kaasch

(57) ABSTRACT

An object oriented rule-based system and method that combines rule-based technology and object-oriented programming in order to provide an efficient approach for adding decision-making and inferencing capabilities to different applications. The rule-based system can include a RETE match algorithm, which can be modified to support pure object-based variable pattern matching. The LHS of a rule base can be compiled into several condition patterns, which includes a transformer integer array in order to record object variables positions. A RETE node can propagate tokens smoothly by asserting the object variable based on inheritance type hierarchy and the rules can be fired when the conditions are satisfied. The object oriented rule system can be utilized to add or remove rules at run time.

20 Claims, 16 Drawing Sheets

```
WorkingMemoryToken CombineToken(WorkingMemoryToken left, int[] transformerLeft,
WorkingMemoryToken right, int[] transformerRight)
{
        if (left.IsEmpty || right.IsEmpty)
                return null;

IList tuples1 = left.Tuples, tuples2 = right.Tuples;
        if (tuples1.Count > tuples2.Count)
        {
                tuples1 = tuples2;
                tuples2 = left.Tuples;
        }

SingleToken result = new SingleToken();
        foreach (WorkingMemoryElement wme in tuples1)
        {
                if (tuples2.Contains(wme))
                        result.AddTuple(wme);
        } return result;
}
```

FIG.5

```
WorkingMemoryToken CombineToken(WorkingMemoryToken left, int[] transformerLeft,
WorkingMemoryToken right, int[] transformerRight)
{
        if (left.IsEmpty || right.IsEmpty)
                return null;

ICollection first = left.Tuples;
        ICollection second = right.Tuples;

if (transformerLeft[0] == -1)
        {
                first = second;
                second = left.Tuples;
        }

MultipleToken result = new MultipleToken(ColumnCount);

foreach (WorkingMemoryElement wme1 in first)
        {
                foreach (WorkingMemoryElement wme2 in second)
                        result.AddTuple(new WorkingMemoryElement[2]{wme1, wme2});
        } return result;
}
```

FIG.6

```
WorkingMemoryToken CombineToken(WorkingMemoryToken single, int[]
transformerSingle, WorkingMemoryToken multiple, int[] transformerMultiple)
{
        if (single.IsEmpty || multiple.IsEmpty)
                return null;

int i = 0;
        for (; i < ColumnCount; i ++)
                if (transformerSingle[i] == 0) break;

MultipleToken result = new MultipleToken(ColumnCount);

foreach (WorkingMemoryElement wme in single.Tuples)
        {
                foreach (WorkingMemoryElement[] tuple in multiple.Tuples)
                {
                        if (wme != tuple[i])
                                continue;

WorkingMemoryElement[] target = new
WorkingMemoryElement[ColumnCount];
                        for (int j = 0; j < ColumnCount; j ++)
                                target[j] = tuple[transformerMultiple[j]];

result.AddTuple(target);
                }
        } return result;
}
```

FIG.7

```
WorkingMemoryToken CombineToken(WorkingMemoryToken single, int[]
transformerSingle, WorkingMemoryToken multiple, int[] transformerMultiple)
{
        if (single.IsEmpty || multiple.IsEmpty)
                return null;

MultipleToken result = new MultipleToken(ColumnCount);

int i = 0;
        for (; i < ColumnCount; i ++)
                if (transformerSingle[i] == 0) break;

foreach (WorkingMemoryElement wme in single.Tuples)
        {
                foreach (WorkingMemoryElement[] tuple in multiple.Tuples)
                {
                        WorkingMemoryElement[] target = new
WorkingMemoryElement[ColumnCount];

int j = 0;
                        for (; j < i; j ++)
                                target[j] = tuple[transformerMultiple[j]];

Debug.Assert(i == j);
                        target[j] = wme;

for (j ++; j < ColumnCount; j ++)
                                target[j] = tuple[transformerMultiple[j]];

result.AddTuple(target);
                }
        } return result;
}
```

FIG.8

```
WorkingMemoryToken CombineToken(WorkingMemoryToken left, int[] transformerLeft,
WorkingMemoryToken right, int[] transformerRight)
{
        if (left.IsEmpty || right.IsEmpty)
                return null;

MultipleToken result = new MultipleToken(ColumnCount);

int l, r;
        foreach (WorkingMemoryElement[] tupleLeft in left.Tuples)
        {
                foreach (WorkingMemoryElement[] tupleRight in right.Tuples)
                {
                        WorkingMemoryElement[] target = new WorkingMemoryElement[ColumnCount];
                        int i = 0;
                        for (; i < ColumnCount; i ++)
                        {
                                l = transformerLeft[i];
                                r = transformerRight[i];
                                Debug.Assert(l != -1 || r != -1);
                                if (l != -1 && r != -1 && tupleLeft[l] != tupleRight[r])
                                        break;
                                target[i] = (l == -1) ? tupleRight[r] : tupleLeft[l];
                        } if (i == ColumnCount)
                                result.AddTuple(target);
                }
        } return result;
}
```

FIG.9

```
WorkingMemoryToken CombineToken(WorkingMemoryToken left, int[] transformerLeft,
WorkingMemoryToken right, int[] transformerRight)
{
        if (left.IsEmpty || right.IsEmpty)
                return null;

MultipleToken result = new MultipleToken(ColumnCount);

int l, r;
        foreach (WorkingMemoryElement[] tupleLeft in left.Tuples)
        {
                foreach (WorkingMemoryElement[] tupleRight in right.Tuples)
                {
                        WorkingMemoryElement[] target = new
WorkingMemoryElement[ColumnCount];
                        for (int i = 0; i < ColumnCount; i ++)
                        {
                                l = transformerLeft[i];
                                r = transformerRight[i];
                                target[i] = (l == -1) ? tupleRight[r]: tupleLeft[l];
                        }
                        result.AddTuple(target);
                }
        } return result;
}
```

FIG.10

| ID | Condition | Transformer |
|---|---|---|
| CP0 | Teacher{0}.Punished | [ 0, -1, -1, -1] |
| CP1 | Student{0}.TeacherID = Teacher{1}.ID | [ 0, 1, -1, -1] |
| CP2 | Student{0}.Mark < 60 | [-1, 0, -1, -1] |
| CP3 | Student{0}.TeacherID = Teacher{1}.ID | [0, -1, 1, -1] |
| CP4 | Student{0}.Mark < 60 | [-1, -1, 0, -1] |
| CP5 | Student{0}.TeacherID = Teacher{1}.ID | [0, -1, -1, 1] |
| CP6 | Student{0}.Mark < 60 | [-1, -1, -1, 0] |
| CP7 | Student{0}.ID = Student{1}.ID | [-1, 0, 1, -1] |
| CP8 | Student{0}.ID = Student{1}.ID | [-1, -1, 0, 1] |
| CP9 | Student{0}.ID = Student{1}.ID | [-1, 0, -1, 1] |

OBJECT ORIENTED RULE-BASED SYSTEM AND METHOD

TECHNICAL FIELD

Embodiments are generally related to data processing methods and software systems. Embodiments are also related to rule-based and object-oriented programming. Embodiments are additionally related to the coupling of object-oriented programming with rule-based technology.

BACKGROUND OF THE INVENTION

In current business scenarios, rapid market changes can lead to constant variations in customer requirements. Commercial establishments must respond by altering their business models and applications in order to implement changes in their businesses. The flexibility and rapid adaptability in keeping pace with changing requirements play a key role in the success or failure of the business.

The majority of prior art applications embed or hard-code the business logic in a code, thereby rendering it difficult to change the application quickly to adapt to changing market needs. Similarly, altering the application calls for the developers to modify the logic, which most often amounts to reworking the code, which is a time consuming and expensive proposition.

As businesses strive to become more agile and competitive, they need to increase productivity, lower development costs, support customization and maintenance, and reduce time-to-market. Each application possesses its own set of business logic, which may not be shared across applications. Such business logic should comply with the business requirements of a company. A change in business policy, for example, calls for some changes in every application containing such business logic.

A rule-based system can be a promising approach for use in addressing the aforementioned problems. The business logic is separated from the rest of the application code, and hence unforeseen changes can be easily handled. In this manner, the application can become more nimble and competitive, and the domain experts can make changes to the business logic, with perhaps little or no assistance from the developers. This approach therefore allows users to create, modify or remove business rules to reflect the dynamic changes in the business logic.

In a rule-based expert system, a knowledge base typically incorporates definitions of facts and rules along with control information. An inference engine, which is sometimes referred to as a "rule interpreter" or a "rule engine" provides a reasoning mechanism in the expert system. The inference engine typically implements forward chaining and backward chaining strategies. Forward chaining is a process of applying a set of previously determined rules to the facts in a knowledge base to determine if any of them are active and thereby generate new facts. In essence, all derivable knowledge can be derived in forward chaining. Backward chaining is goal-driven and utilized to process some queries against the knowledge base. A query can be considered as a goal and the knowledge base can be searched for facts supporting that goal. Antecedents of such rules are made sub goals for further search, if necessary. Inference engines designed for expert systems are increasingly utilized in business automation.

The RETE match algorithm is widely accepted as one of the best solutions for many pattern or object pattern-matching problems. RETE generally refers to a Latin word 'rete' that means net or network which provides the basis for a more efficient implementation of the rule-based expert system. The majority of current rule-based systems utilize the RETE match algorithm to optimize their performance and are mainly applied in production systems for the support of forward chaining inference. One of the main advantages of the RETE match algorithm is that it saves state information between the forward cycles. In every cycle only the working memory changes are processed. Moreover, this algorithm exploits the structural redundancy of the rules.

The RETE algorithm improves the speed of forward-chained rule systems by limiting the effort required to recompute the conflict set after a rule is fired. Other advantages of the RETE algorithm include "temporal redundancy" and "structural similarity". Temporal redundancy occurs because firing of the rule usually changes only a few facts, and only a few rules are affected by each of those changes. Structural similarities exist because the same pattern often appears in the left-hand side of more than one rule. Facts are variable-free tuples, patterns are tuples with some variables, and rules possess left-hand side lists of patterns.

The RETE algorithm utilizes a rooted acyclic directed graph, referred to as the RETE or RETE network, where nodes, with the exception of the root, represent patterns; and paths from the root to the leaves represent the left-hand side of rules. At each node is stored information about the facts satisfied by the patterns of the nodes in the paths from the root up to and including this node. This information constitutes a relation representing the possible values of the variables occurring in the patterns in the path.

The RETE methodology provides for keeping the information associated with the nodes in the graph up to date. A working memory element (WME) is an input data structure. When a fact is added or removed from a working memory, a token representing that fact and operation is entered at the root of the graph and propagated to its leaves modifying, as appropriate, the information associated with the nodes. Each time a token is pushed or processed through the RETE and is matched with patterns in a RETE, a pattern match operation results. Some prior art systems utilize RETE algorithms in object-oriented or object-based environments, which constitutes the mainstream of current software development, such as "Jess". Jess is a rule engine and scripting environment written entirely in Sun's Java™ language by Ernest Friedman-Hill of Sandia National Laboratories in Livermore, Calif. Using Jess, developers can construct Java software with the capacity to "reason" using knowledge supplied in the form of declarative rules. Another java-based RETE implementation is the "drools" approach.

Object oriented (OO) techniques have been widely utilized to produce software systems that fulfill business requirements. Objects are autonomous entities with an optional state and which respond to requests. An object functions as an entity that encapsulates some private state information or data, a set of associated operations or procedures that manipulate the data; or a possible thread of control so that collectively such a formation can be treated as a single unit. Object-oriented systems include two important features in addition to encapsulation. "Inheritance" is a mechanism that permits objects to be developed from existing objects simply by specifying how the new objects differ from the original. This means that an object may inherit the behavior and operations of a super object. All objects can communicate using the mechanism of message passing, and the processing activity takes place within objects. Inheritance allows classification, sub-classification and super-classification of objects, which permits their properties to be shared. "Polymorphism" is the ability of the entity for e.g., a variable, to refer to instances of different classes at run-time. Practically, this means that a single message to an object can be processed in different ways depending on the object itself.

The majority of prior art RETE object-oriented rule engines possess unnatural expressions of business rules with regards to business objects. Another limitation of these rule engines is that they are typically based on a dynamic language, script environment and reflection features. Hence, such engines cannot be utilized in static object-oriented language such as C++, with full compilation of rule-base approaches.

Based on the foregoing it is believed that a need exists for an improved system and method that integrates both object-oriented technology and rule-based reasoning approaches. Additionally, a need exists for providing a methodology to add decision-making and inferencing capabilities to business applications.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing method and system.

It is another aspect of the present invention to provide for an improved rule-based and object-oriented programming system and process.

It is a further aspect of the present invention to provide for an improved system and method for coupling object-oriented programming with rule-based technology.

The aforementioned aspects and other objectives and advantages can now be achieved as described herein. An object oriented rule-based system that combines rule-based technology and object-oriented programming in order to provide an efficient approach to add decision-making and inferencing capabilities to business applications. The rule-based system includes a RETE match algorithm, which can be modified to support pure object-based variable pattern matching. The LHS (Left-Hand Side) of a rule base can be compiled into several condition patterns, which includes a transformer integer array in order to record object variable positions. A RETE node can propagate tokens smoothly by asserting the object variable based on inheritance type hierarchy and the rules can be fired when the conditions are satisfied. The object oriented rule system can be utilized to add or remove rules at run time.

The RETE node can be built by loading a compiled domain model, as well as a compiled rule base and the domain objects can be asserted and the rules can be fired in order to make business logic work. The transformer integer array can be generated by a rule compiler. A tree structure, such as a RETE tree, can comprise a network of connected nodes. For example, a ReteNode can include a TypeNode, a Parameters Node, an AlphaReteNode or OneInputNode, BetaReteNode or TwoInputNode, and a TerminalNode. New rules can be added by adding alpha pattern nodes and the existing beta pattern nodes into a target RETE tree. Pattern instances can be propagated from the alpha pattern nodes. A determination can be made whether there are more than one parameter instance in a result set. If single pattern instances exist, then the tree structure can be terminated. Otherwise, the beta pattern node can be constructed from the pattern instances, which have been propagated to the result set. The beta pattern node can be added into the target RETE tree and the pattern instances can be removed from the tree.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 5 illustrates a token join code for join pattern A depicted in FIG. 4, in accordance with a preferred embodiment;

FIG. 6 illustrates a token join code for join pattern B depicted in FIG. 4, in accordance with a preferred embodiment;

FIG. 7 illustrates a token join code for join pattern C depicted in FIG. 4, in accordance with a preferred embodiment;

FIG. 8 illustrates a token join code for join pattern D depicted in FIG. 4, in accordance with a preferred embodiment;

FIG. 9 illustrates a token join code for join pattern F depicted in FIG. 4, in accordance with a preferred embodiment;

FIG. 10 illustrates a token join code for join pattern G depicted in FIG. 4, in accordance with a preferred embodiment;

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software module can be typically implemented as a collection of routines and data structures that performs particular tasks or implements an "object".

The term "component" as utilized herein can therefore generally refer to software modules or implementations thereof. Each component handles one conceptually distinct aspect or area of the expertise needed to be proficient in an overall application domain. The component can be able to call other components as subroutines in the course of their own processing. Such component can be utilized separately or together to form a program product that can be implemented through signal-bearing media, including transmission media and/or recordable media. An example of such a component is software module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of non-transitory signal-bearing media utilized to actually carry out the distribution. Examples of signal bearing media include, but are not limited to, recordable-type media such as media storage or CD ROMs and transmission-type media such as analogue or digital communications links.

Figure 1:
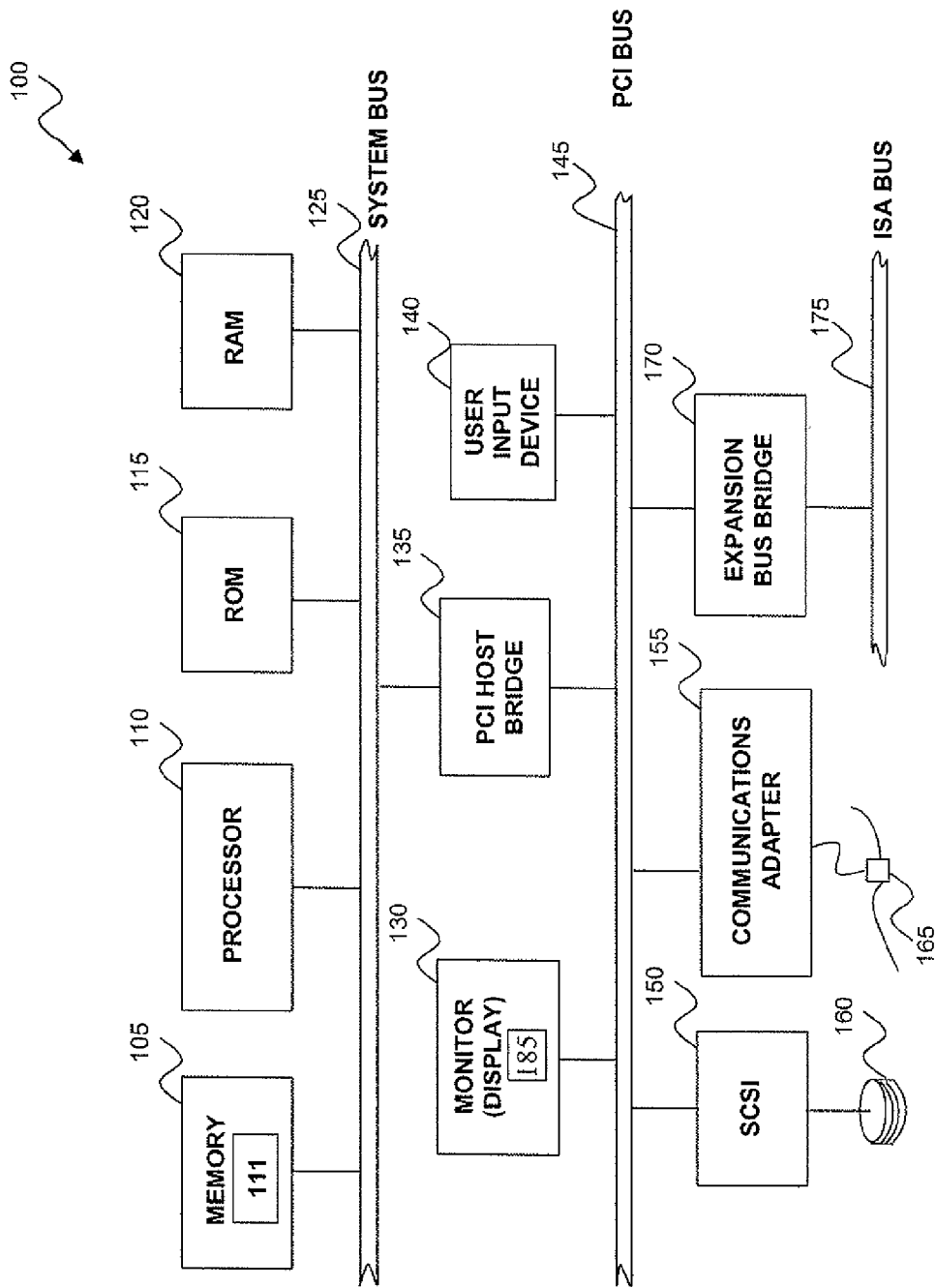
FIG. 1 illustrates a block diagram of a data-processing apparatus, which can be utilized in the context of an object oriented rule-based system, in accordance with a preferred embodiment.

Referring to the drawings and in particular to FIG. 1, there is depicted a data-processing system or apparatus 100, which can be utilized in the context of an object oriented rule-based system in accordance with a preferred embodiment. Data-processing apparatus 100 represents one of many possible data-processing systems and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a processor (CPU) 110, a Read-Only memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

Data-process apparatus 100 thus includes CPU 110, ROM 115, RAM 120, and a rendering device 190 (e.g., printer, copier, scanner, etc.), which are also coupled to a PCI (Peripheral Component Interconnect) local bus 145 of data-processing apparatus 100 through PCI host-bridge 135. The PCI Host Bridge 135 can provide a low latency path through which processor 110 may directly access PCI devices mapped anywhere within bus memory and/or input/output (I/O) address spaces. PCI Host Bridge 135 also can provide a high bandwidth path for allowing PCI devices to directly access RAM 120.

A communications adapter 155, an SCSI (Small Computer System Interface) 150, and an expansion bus-bridge 170 can be also attached to PCI local bus 145, depending of course, upon design considerations. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

The object oriented rule system can be provided as a software module such as, for example, the RETE network module 111 of apparatus 100 depicted in FIG. 1. It can be understood that the RETE network module 111 can be represented in a variety of other configurations. By way of example only, RETE network module 111 may take the form of hardware or firmware, which may be configured, in a read only memory (ROM) device 115. Moreover, RETE network module 111 may take the form of multiple configured ROMS, where each ROM executes a specific operation analogous to that executed by RETE network module 111. Memory 105 can be utilized as a working memory for storing control and input data elements of a RETE system. It can also be understood, that the object oriented rule system typically can be operated in conjunction with additional software modules (not shown). Such additional software modules can be necessary so that the object oriented rule system application can be developed.

Figure 2:
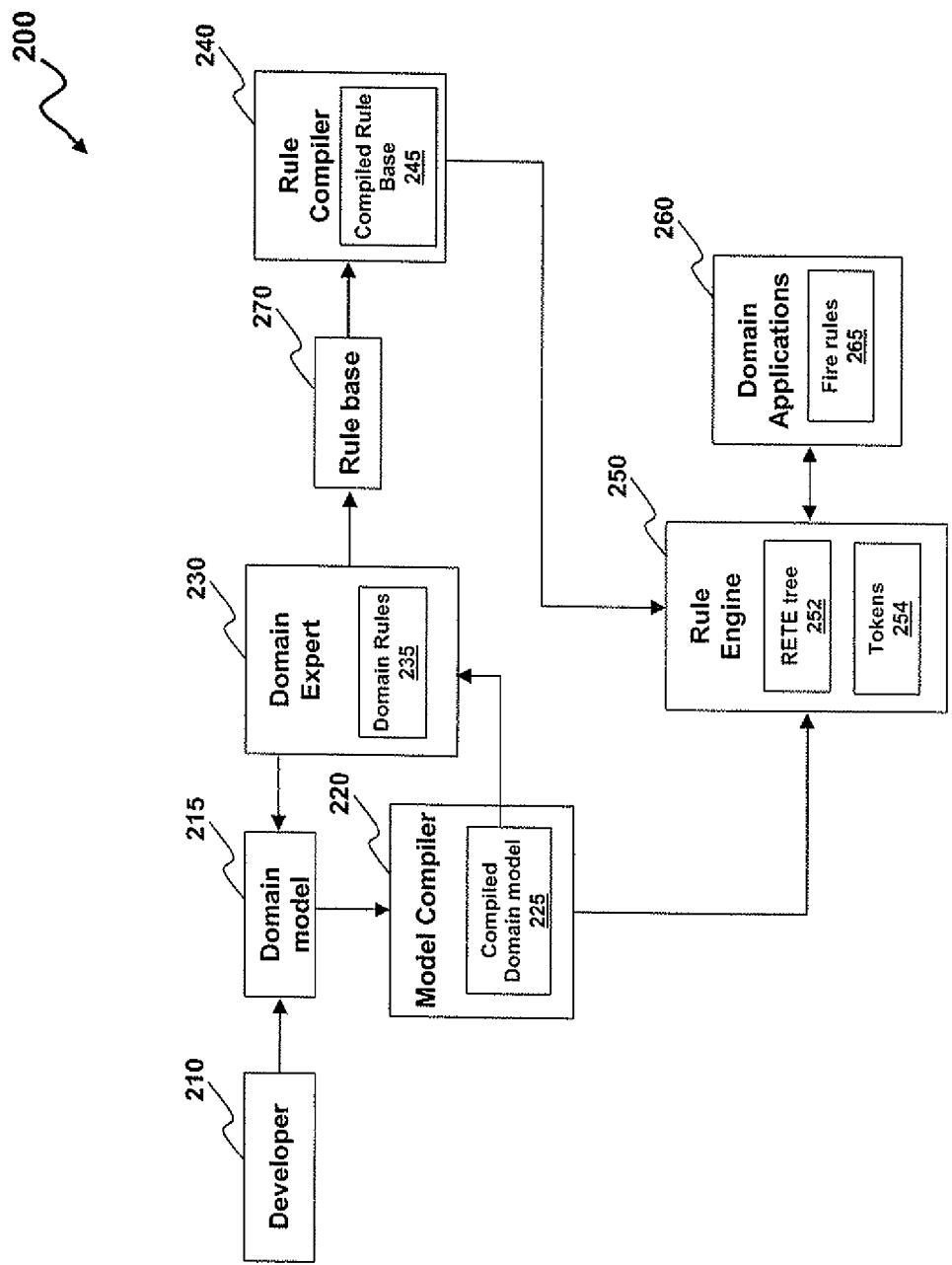
FIG. 2 illustrates a block diagram representing the activities of a rule-based system, which can be implemented in accordance with a preferred embodiment.

FIG. 2 illustrates a block diagram depicting the activities of an object oriented rule-based system 200, which can be implemented in accordance with a preferred embodiment. As shown in FIG. 2, the compiled domain model 225 can be built out both by a developer 210 and a domain expert 230 utilizing domain-modeling tools such as Model Driven Architecture (MDA) tools. MDA is a software design approach which also supports model-driven engineering of software systems. MDA also provides a set of guidelines for structuring specifications that can be expressed as models. Note that rule-based system 200 can be provided as a rule-based module or rule-based model.

The domain model 215 can be compiled by a model compiler 220. The rule-based system 200 can be designed so that after compilation and linking with the object-oriented program, the application program has global control of the inferencing process. As used herein, the term "object-oriented program" refers generally to a program written in an object-oriented language. This program is assumed to include classes that may be instantiated to become objects, using for example, C++ terminology, or analogously, to include some other means of knowledge representation that permits the processing of objects and the inheritance of object methods or attributes. Sets of rules are organized as rule-sets. Inferencing can be initiated from the application program. The domain expert 230 can define business logic as rule base 270 with the help of front-end tools based on the compiled domain model 225. The business logic can be stored in intermediate rule language, such as RuleML, SWRL, etc.

A rule compiler 240 can be utilized to compile the business logic from the intermediate format into binary data, which is processed at rule authoring or deployment time and can further be utilized in the target object-oriented environment. The rule compiler 240 also assembles a RETE tree 252 in memory from the intermediate format directly at runtime. Each rule is specified by a set of conditions and a set of actions, such that the rule is eligible to execute its actions to "fire" when its conditions are satisfied. A rule engine 250 can be utilized to build the RETE tree 252 from the compiled domain model 225, the compiled rule base 245 and the domain application 260. The domain objects can be asserted by domain applications 260 and tokens 254 can be generated and propagated. The rules can be fired when the conditions are satisfied in order to make business logic work as illustrated at block 265. The rule engine 250 and rule compiler 240, the core components of a rule system 200 can be implemented in any object-oriented programming language.

Figure 3:
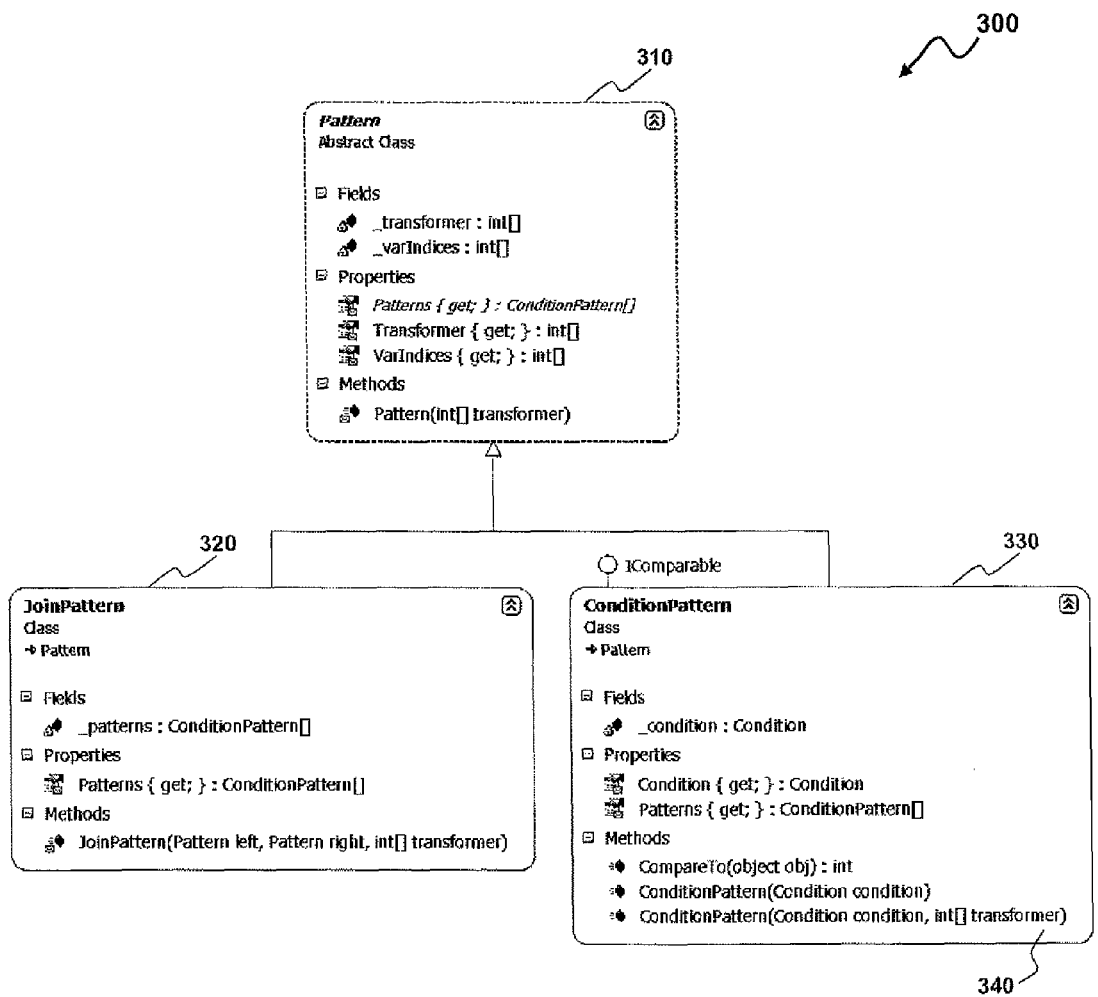
FIG. 3 illustrates a UML class diagram indicative of a pattern class hierarchy in a compiled set of rules, in accordance with a preferred embodiment.

Referring to FIG. 3, a UML (Unified Modeling Language) class diagram 300 indicative of a pattern class hierarchy in a compiled set of rules, in accordance with a preferred embodiment. In the example illustrated in FIG. 3, the class diagram 300 is provided in the form of a screenshot. The screenshot of diagram 300 includes a pattern 310 provided as an abstract class, and a JoinPattern 320 in addition to a ConditionPattern 330, which also constitutes a class. The rule system 200 can include an interface that permits the rule system 200 to operate directly on class instances created with an object-oriented language. The LHS of a rule can be compiled into several components, one example of which is a ConditionPattern 330. As depicted in FIG. 3, the ConditionPattern 330 can include a transformer 340. The transformer 340 can be provided as an integer array, which records the object variables positions of the rule's LHS in a condition.

For example, if five objects (e.g., var, var2, var3, var4, var5) are utilized in a rule and one ConditionPattern of the LHS utilize var1, var3, and var5, then the transformer 340 can be [0, −1, 1, −1, 2]. This means that the var1 can be a first variable used in this condition pattern 330 with an index start from zero, the var2 and var4 is not used in current ConditionPattern 330 which can be represented as −1, the var3 is the second variable used in the ConditionPattern 330, and the var5 is the third variable in the ConditionPattern 330. The transformer 340 is very important in the pattern matching process. The rule system 200 provides several functions that can be embedded in a rule's action and used to manipulate the class instances that form the working memory.

Figure 4:
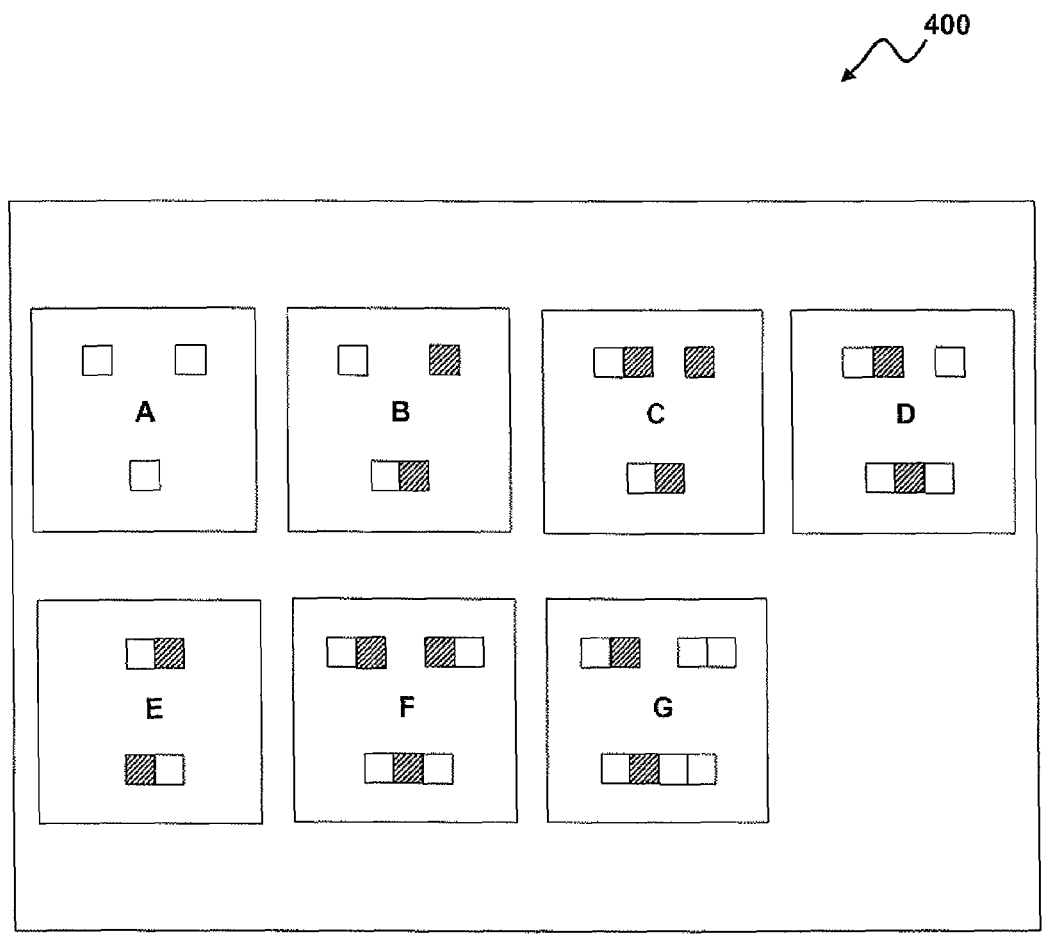
FIG. 4 illustrates a block diagram of token join patterns in a RETE tree, in accordance with a preferred embodiment.

Referring to FIG. 4, a block diagram of token join patterns 400 in a RETE tree is illustrated, in accordance with a preferred embodiment. The token join patterns 400 include seven cases A-F of token joining. Referring to FIG. 4, case A represents two single variable tokens joining into a same variable token. FIG. 5 illustrates a token join code 415 for join pattern A depicted in FIG. 4, in accordance with a preferred embodiment. The code 415 can be an object-oriented programming language. Case B illustrates a join token pattern of two different single variable tokens joining into a two variables token. The related token join code 425 for join pattern B is illustrated in FIG. 6. Case C illustrates a join token pattern of multiple variables join a single variable token which has the same variable in the former token into a token with multiple variables.

Figure 11:
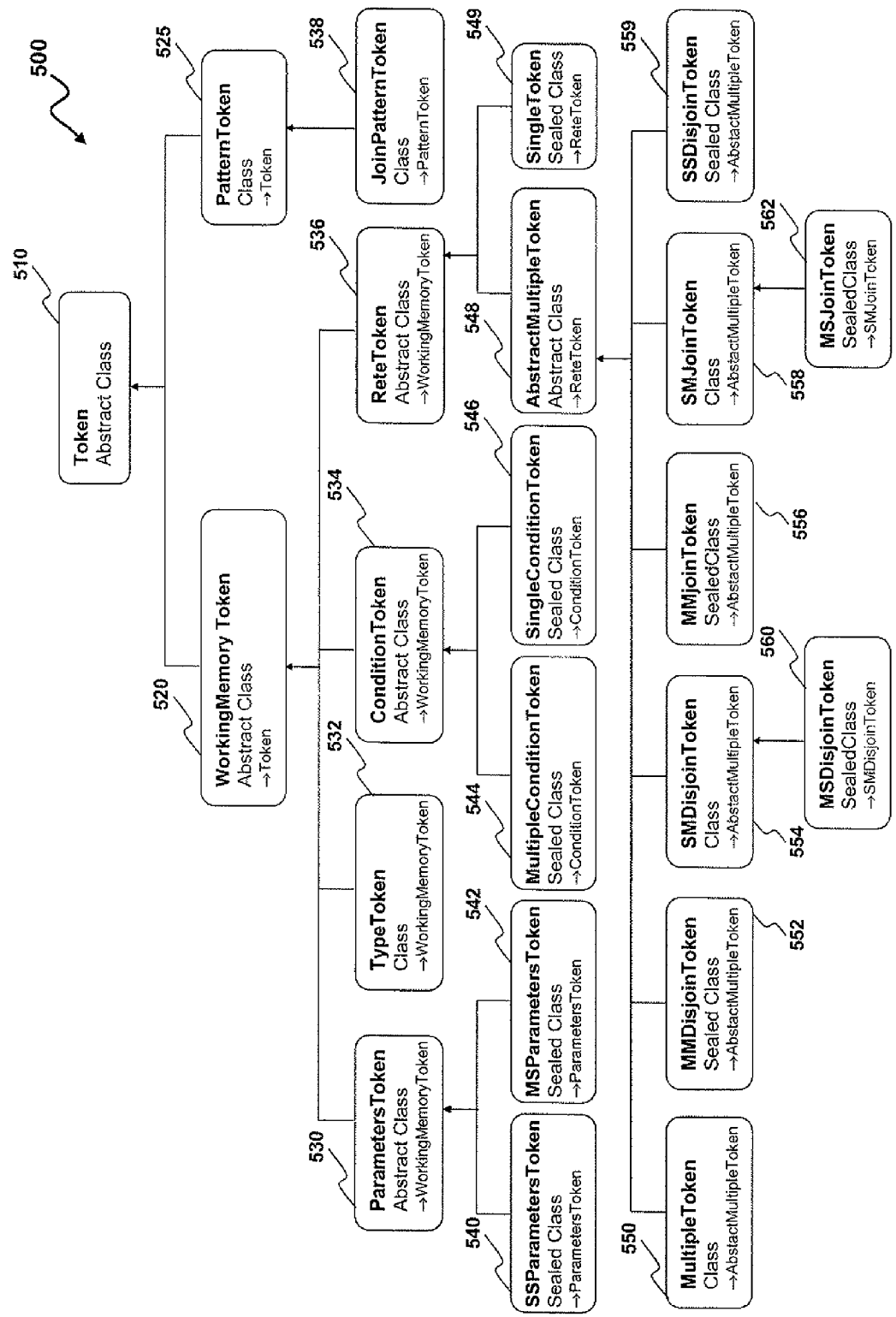
FIG. 11 illustrates a block diagram of a token hierarchy, which can be implemented in accordance with a preferred embodiment.

The related token join code 435 for join pattern C is illustrated in FIG. 7. Case D is different with case C that there is no same variable shared between the two input tokens of former. The related token join code 445 for join pattern D is illustrated in FIG. 8. The scenario case E in FIG. 3 can be avoided by proper rule compiler implementation. The code for propagating tokens for the case E, case F and case G in FIG. 3 are shown in FIG. 8, FIG. 9 and FIG. 10 respectively. Referring to FIG. 11, a block diagram of a token hierarchy 500 is illustrated, which can be illustrated in accordance with a preferred embodiment. When a fact is added or removed from a working memory such as the memory 105 depicted in FIG. 1, a token representing that fact and operation can be generated. The token hierarchy 500 can include the major functionality for the rule-based system 200. The token hierarchy 500 generally forms a tree-like structure to enable the conditional flow of each token provided for the particular rule-based system 200. In such a token hierarchy 500, a token 510 may be created and defined as a base class in object-oriented programming, through which a set of sub or derived classes can be made. The token 510 is a fundamental unit of communication in a RETE network. The token 510 represents facts and operation of an item and includes embedded data defining rules and/or capabilities which apply to use of the item, where the facts are variable-free tuples. This token class 510 can mainly be classified into a WorkingMemoryToken 520 and a PatternToken 525.

The token 510 can enter at a root of the RETE network and propagated to its leaves, thereby modifying the appropriate information associated with the nodes of the RETE network. In the main classification of the token 510, the WorkingMemoryToken 520 can be accessed by a developer to add or remove the facts and information for changing business models and business applications. The WorkingMemoryToken 520 represents the structures and processes utilized for temporarily storing and manipulating information in the rule-based system 200. The WorkingMemoryToken 520 can be sub-divided into ParametersToken 530, TypeToken 532, ConditionToken 534 and ReteToken 536, which are derived classes for the WorkingMemoryToken 520. The Parameters Token 530 can be a placeholder that represents parameters for the token 510, where the parameters can be defined as single-single parameters and multiple-multiple parameters in the derived class i.e. SSParametersToken 540 and MSParameters Token 542, of the ParametersToken 530.

Similarly, the TypeToken 532 and the ConditionToken 534 respectively contain specific-type information and condition information of the facts in the business applications. The ConditionToken 534 can be implemented as a MultipleConditionToken 544 and a SingleConditionToken 546. Furthermore, the ReteToken 536 can support activation for a set of rules in rule-based applications. The ReteToken 536 can be sub-classified into an AbstractMultipleToken 548 and a SingleToken 549 that separately define information related to the activation of the set of rules. Thereafter, the AbstractMultipleToken 548 is further divided into a MultipleToken 550, a MMDisjoinToken 552, a SMDisjoinToken 554, a MMjoinToken 556, a SMJoinToken 558 and an SSDisjoinToken 559. Each derived class of the AbstractMultipleToken 548 defines its own properties linked with the rules activation process in the ReteToken 536. In addition, the PatternToken 525 in the main classification represents a pattern, which is a form, template, or model with a set of rules. The pattern can be utilized to make or to generate the specific items or parts of the specific items declared in the rule system. In this PatternToken 525, a JoinPatternToken 538 can be formed to provide information about linking of each patterns in the rule system. The SMDisjoinToken 554 and SMJoinToken 558 can further be classified into MSDisjoinToken 560 and MSJoinToken 562.

Figure 12:
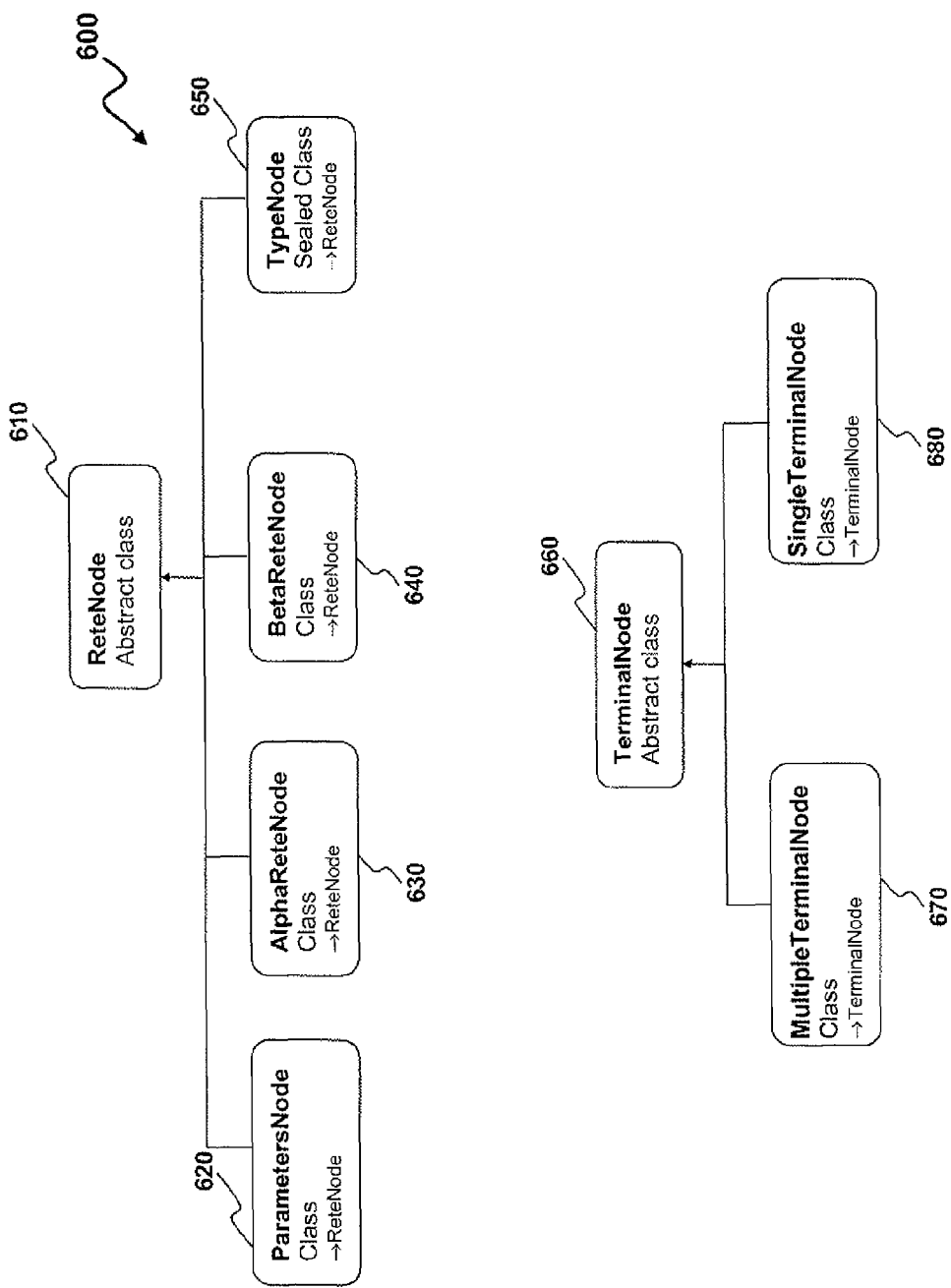
FIG. 12 illustrates a block diagram of a RETE node hierarchy, which can be implemented in accordance with a preferred embodiment.

Referring to FIG. 12 a block diagram of a RETE node hierarchy 600 is illustrated, which can be illustrated in accordance with a preferred embodiment. The RETE node hierarchy 600 is intended in a RETE network of the RETE Algorithm that improves the speed of forward-chained rule systems by limiting the effort required to recompute the conflict set after a rule is fired. The implementation of the RETE algorithm is probably easier for pattern matching, where the pattern matching can be done only when the LHS (i.e., "left-hand side") of the rule is satisfied. In RETE algorithm, the modification operation is implemented as a single update-in-place operation. This results in much faster execution of working memory modification and also prevents annoying re-triggering of the rules in the rule-based system 200. This RETE algorithm can be utilized in object-oriented production (OOP) language, which enables users to specify an appropriate ordering or a clustering of join operations. The RETE algorithm can be evaluated by implementing an optimizer applicable to the production language.

The RETE node hierarchy 600 comprises a network of connected nodes. The ReteNode 610 comprises a TypeNode 650, a ParametersNode 620, an AlphaReteNode 630 or OneInputNode, BetaReteNode 640 or TwoInputNode, and a TerminalNode 660. As illustrated in FIG. 3, there are multiple cases for propagating the tokens 510. The rule system 200 includes only objects with type hence TypeNode 650 can be added as root nodes. Each asserted object can be propagated from the corresponding TypeToken 532 in the TypeNode 650. Considering the main feature of object-oriented system, inheritance, the TypeNode hierarchy 600 can be built as same as the related types or classes hierarchy during the RETE tree generation. TypeNode 650 represent the entry points for objects to be tested and broadcast the objects to the successor nodes in the network based on their object type. The ParamterNode 620 create a tuple with a single entry in the rule-based applications.

The facts enter the RETE tree network 600 through the TypeNode 650. The TypeNode 650 will filter object based on its object type or class. Then the fact propagates into the AlphaReteNode 630. A BetaReteNode 640 receives two inputs from two AlphaReteNode 630. A fact can be filtered inside the AlphaReteNode 630 based on constrains. The constraints, in this case is a fact or an open variable. AlphaReteNode 630 compares the incoming fact if it matches AlphaReteNode 630 constraints. Each AlphaReteNode 630 remembers all facts that match its constraint and passes the facts into the next node. A BetaReteNode 640 takes input from two AlphaReteNode 630 and does operations such as doing compare operation or AND operation, and passes all the facts down to TerminalNode 660.

AlphaReteNode 630 represents intra-element tests, which perform tests against a single object. BetaReteNode 640 represents inter-element tests, which examine attributes of multiple data objects. These tests can be used to determine whether there is relationship between two or more data objects. The inter-element tests require that several data objects of the rules system be brought together so that they are available for testing at one point. To set up the user-defined objects for use by the rules system 200, the programmer modifies their class definitions so that they inherit from a working memory element class as illustrated in FIG. 11. Hence, by inheriting from the working memory element class, the rules system 200 can determine at run time the class type of a given instance. Thus, although the invention is not dependent on a particular object-oriented language, a characteristic of the language is run time type checking.

The RETE algorithm 600 enables results of the evaluation to be available at a single location e.g., in a TerminalNode 660 in the RETE network. Each WME enters the RETE network at a single root node that passes each WME on to its child nodes. Each WME may then be propagated through the network until it arrives at the TerminalNode 660 of the RETE network. Each BetaReteNode 640 outputs WME lists that are sent directly to the TerminalNode 660 of the RETE network. The TerminalNode 660 of the RETE network can also be divided into a MultipleTerminalNode 670 and a SingleTerminalNode 680. The ParamterNode 620 can be utilized to represent multiple variables in same type or class.

An example for multiple variables with same type appear in a same rule condition is set out in the following rule example. Consider there are three persons A, B and C. IF A is B's brother and B is C's father THEN person A is person C's uncle. Hence, two variables A and B, or B and C with same type—"person" can be appeared in the ConditionPattern 330. The ParamterNode 620 can be utilized to represent the multiple variables in same type or class. They can generate permutation or combination from multiple tokens or objects which stored in the parent node i.e., TypeNode 650 for next step token propagation. During the propagating of tokens, in order to make sure that they will end to the TerminalNode 660 with right order of the rule definition, the position of the tokens can be arranged by the transformer 340. Referring to the example, two alpha nodes will be generated for the LHS. One is for condition "person A is person B's brother", the other is for "person B is person C's father". At last, these two alpha nodes can be joined together. During the token propagation in the joined node, the second tuple of former token can be as same as the first tuple of the later token. The transformer 340 can be utilized to maintain the parameter position for each condition pattern. The transformer 340 can be generated by the rule compiler 240.

The pattern matching process can be optimized utilizing a mechanism as follows. In some situations, object inequality implications existed in logic, but they are not defined in the rule explicitly. For example, both the pair A B and pair B C are certainly not a same person in human nature. So the rule authors can add constraint to the rule. The LHS of the example can be: There are three persons A, B and C, A and B are different, B and C are different IF A is B's brother and B is C's father. The constraint "A and B are different" and "B and C are different" are not treated as normal condition patterns. For different objects, the token for propagation is generated by combination, instead of by permutation.

Figure 13:
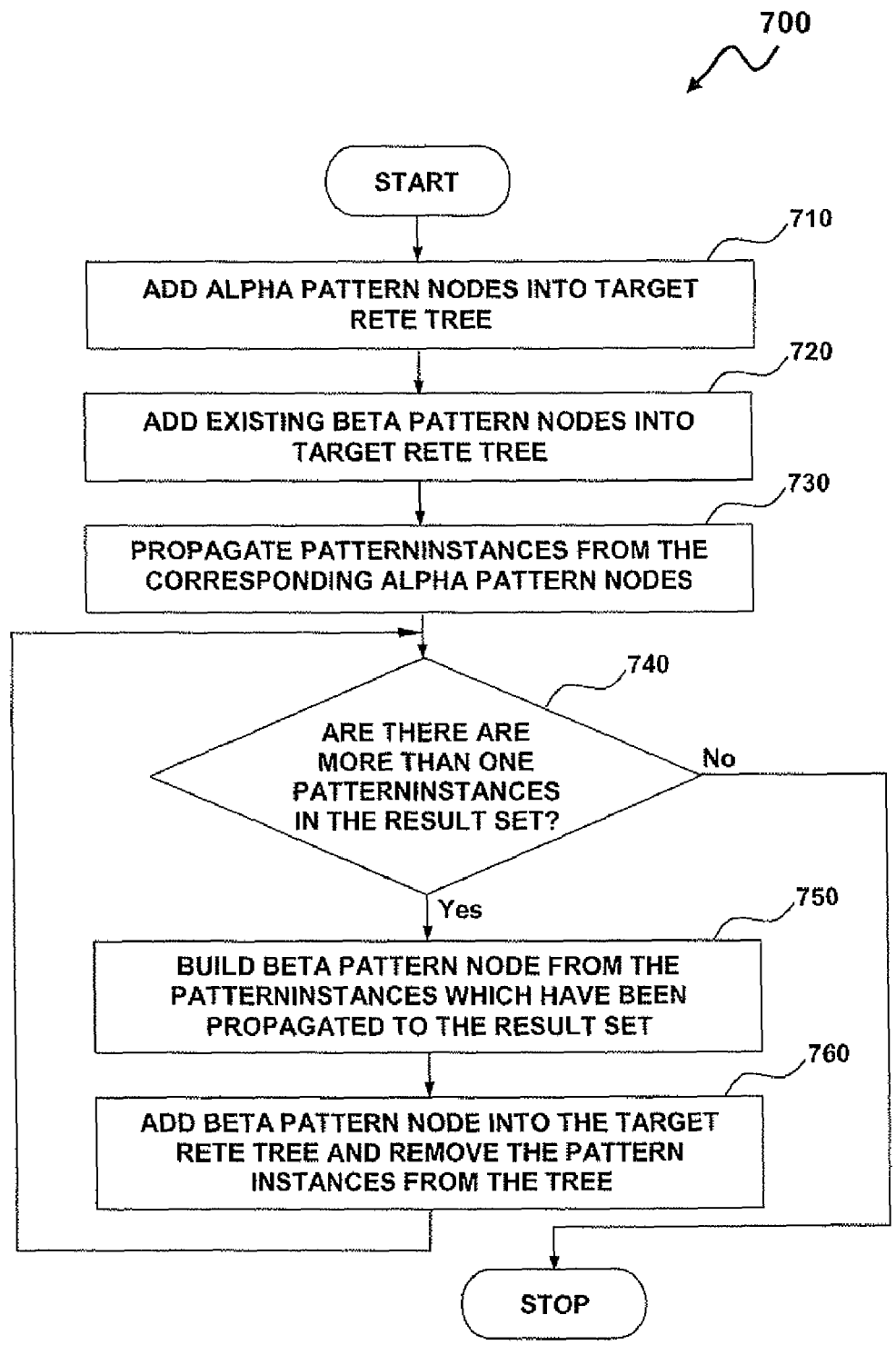
FIG. 13 illustrates a detailed flow chart of operations illustrating logical operational steps of a method for adding new rules to a RETE tree, in accordance with an alternative embodiment.

Referring to FIG. 13 a detailed flow chart of operations illustrating logical operational steps of a method 700 for adding new rules is illustrated, in accordance with an alternative embodiment. Note that the method 700 depicted in FIG. 13 can be implemented in the context of a software module such as, for example, the module 175 of data acquisition system 100 depicted in FIG. 1. Alpha pattern nodes can be added into a target RETE tree, as depicted at block 710. Thereafter, as indicated at block 720, existing beta pattern nodes can be added into the target RETE tree. The pattern instances can be propagated from the alpha pattern nodes, as shown at block 730. Next, as depicted at block 740, a determination can be made whether there are more than one parameter instances in the result set. If there a single pattern instance is present, the method can be terminated, as depicted at block 770. Otherwise, beta pattern node can be built from the pattern instances, which have been propagated to the result set, as depicted at block 750. The beta pattern node can be added into the target RETE tree and the pattern instances can be removed from the tree, as depicted at block 760.

Figure 14:
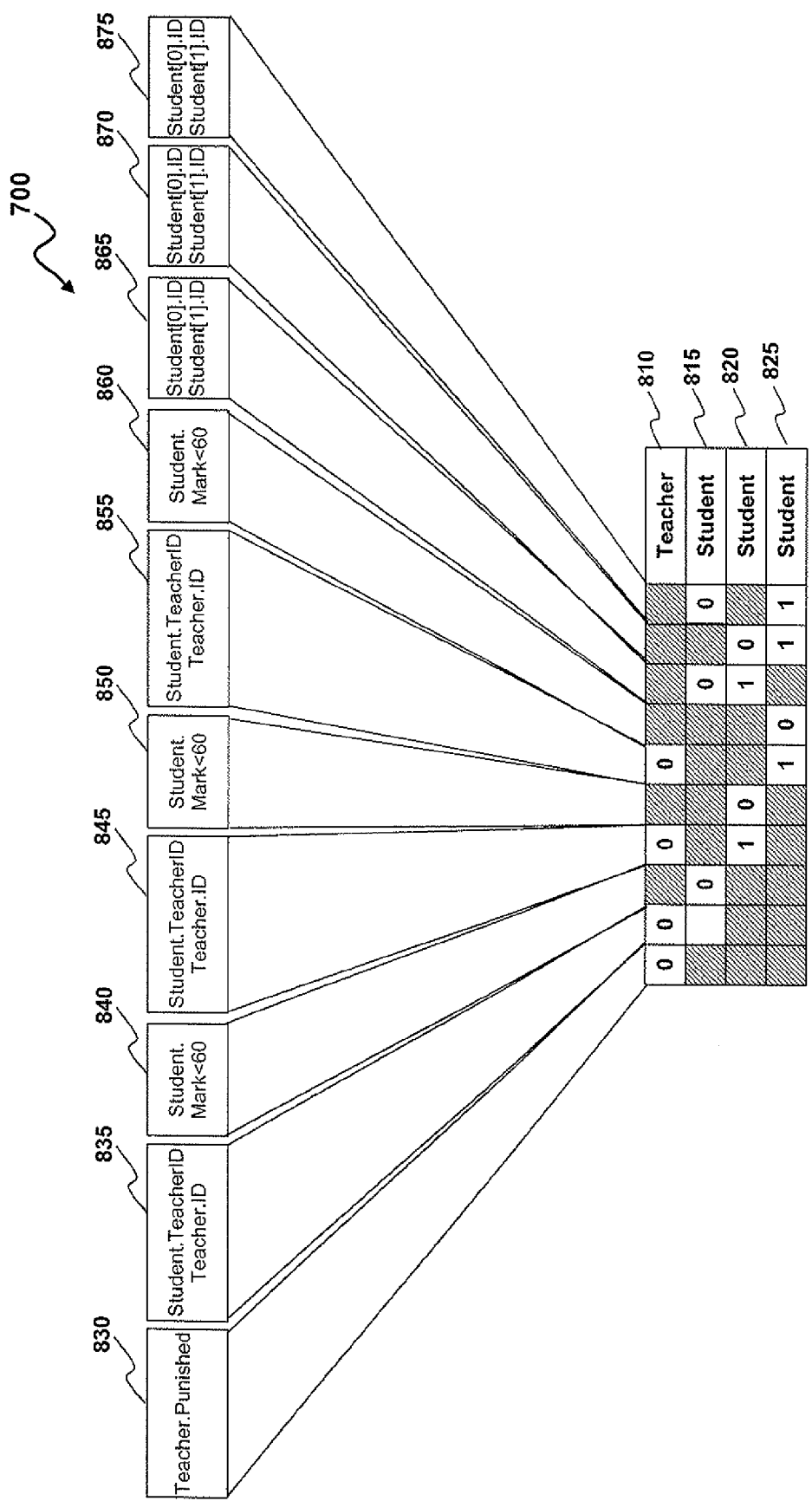
FIG. 14 illustrates a flow diagram of an example condition pattern, in accordance with an exemplary embodiment.
Figure 15:
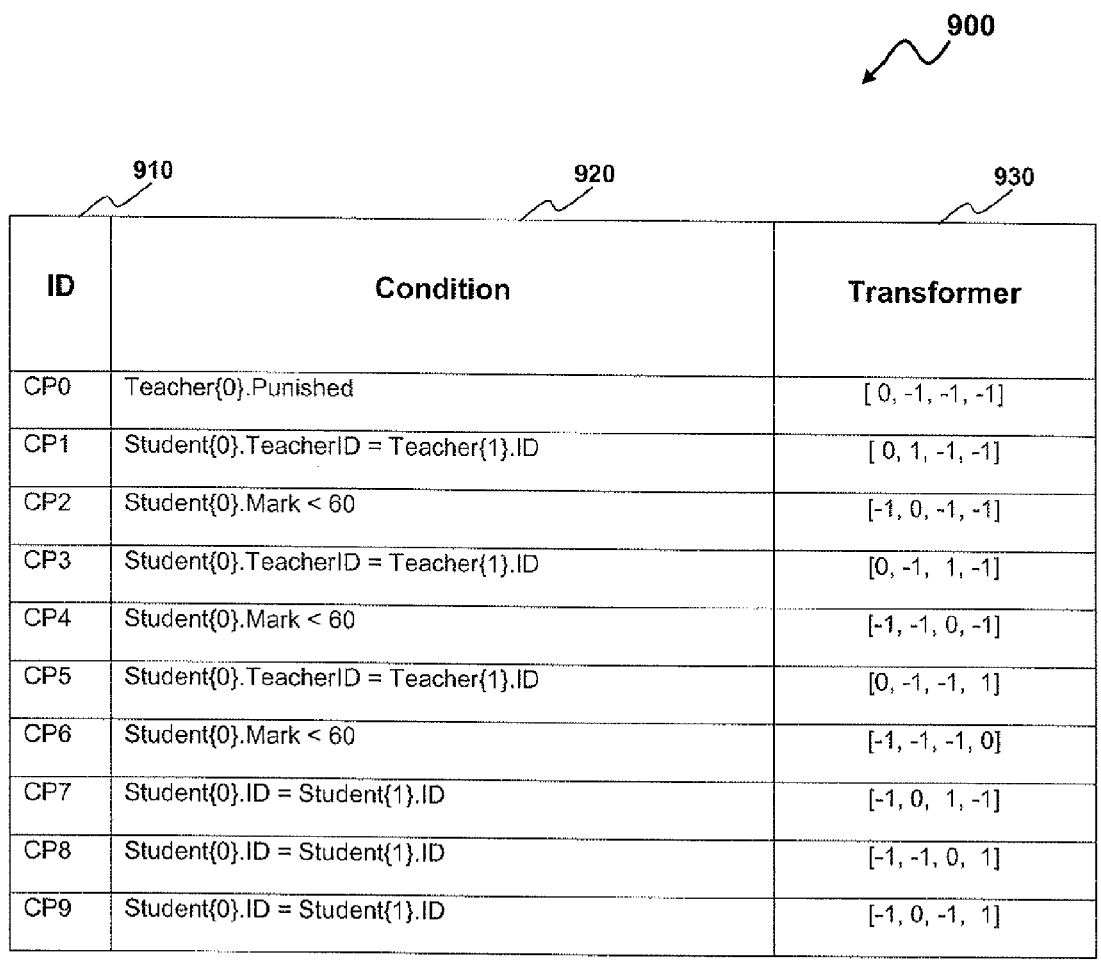
FIG. 15 illustrates a block diagram of the example condition pattern after compilation, in accordance with an exemplary embodiment.

Referring to FIG. 14 a flow diagram of an example condition pattern 800 is illustrated, in accordance with an exemplary embodiment. The example condition pattern 800 comprises a rule (e.g., if a teacher 810 has three students 815, 820, 825, which did not pass a test and/or if the mark is less than 60, then the teacher 810 should be fired). The LHS or the condition part of the rule in a pseudo object-based rule language can be expressed as follows:

Teacher ?t;I
Student ?s1, ?s2, ?s;
   ?t.Punished
   ?s1.TeacherID=?t.ID
   ?s1.Mark<60
   ?s2.TeacherID=?t.ID
   ?s2. Mark<60
   ?s3.TeacherID=?t.ID
   ?s3. Mark<60
   ?s1.ID !=?s2.ID
   ?s2.ID !=?s3.ID
   ?s3.ID !=?s1.ID The LHS for the condition pattern 800 is illustrated in blocks 830-875 in FIG. 14. Referring to FIG. 15 a table 900 illustrating the example condition pattern after compilation is illustrated, in accordance with an exemplary embodiment. The condition patterns 800 can be constructed into a binary format after compilation. The table 900 includes ID 910, condition 920 and transformer 930 for the condition 920. As shown in FIG. 15, the conditions 920 of CP1, CP3, and CP4 are similar and conditions 920 of CP2, CP4, and CP6 are similar. The transformer 930 can be generated for the example condition pattern 800 as illustrated above with an example. Hence only one alpha node can be generated from different condition patterns 920 with same condition during the process of RETE tree generation.

Figure 16:
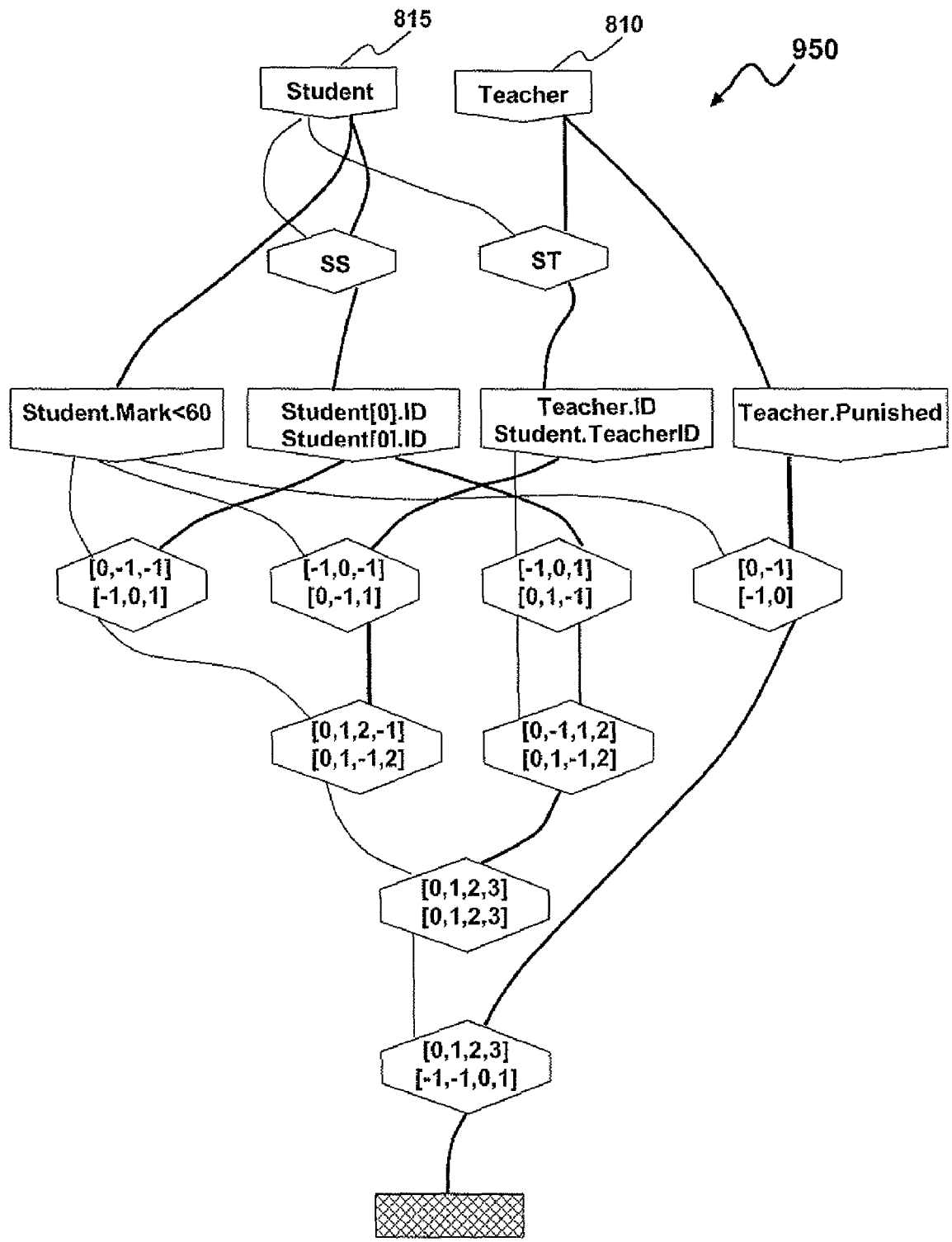
FIG. 16 illustrates a RETE tree of the example condition pattern, in accordance with an exemplary embodiment.

Referring to FIG. 16 a RETE tree 950 of the example condition pattern of FIG. 15 is illustrated, in accordance with an exemplary embodiment. As described above, join node or beta node of the RETE tree 950 utilize two input transformers to generate joined token for propagation.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for combining rule-based technology and object oriented programming, comprising:
   instantiating a rule-based module comprising a plurality of rules utilizing a compiled domain model, wherein said rule-based module comprises an object-oriented representation of said compiled domain model;
   compiling a Left-Hand Side (LHS) of said rule-based module into at least one condition pattern utilizing a rule compiler wherein said condition pattern includes a transformer field, which comprises an integer array for recording the position of a plurality of object variables of said LHS within said condition pattern; and
   generating a tree structure by loading said compiled domain model and said at least one condition pattern associated with said rule-based module and propagating a plurality of tokens by asserting said plurality of object variables based on inheritance type hierarchy wherein said plurality of tokens end at a terminal node.

2. The computer-implemented structure of claim 1 wherein said tree structure comprises a RETE tree.

3. The computer-implemented method of claim 1 further comprising;
   implementing said rule compiler utilizing an object oriented programming language; and
   arranging a position of said plurality of tokens utilizing said transformer field.

4. The computer-implemented method of claim 1 wherein said tree structure comprises a plurality of nodes arranged as a series of linked nodes.

5. The method of claim 1 wherein said rule compiler compiles an intermediate format of said rules-based module into a binary component utilized in a target object-oriented environment.

6. The computer-implemented method of claim 1 wherein said rule-based module is capable of being added and removed during run-time.

7. The computer-implemented method of claim 1 wherein said plurality of nodes comprises a type node, an alpha pattern node, a beta pattern node and said terminal node.

8. The computer-implemented method of claim 7 wherein said type node comprises a root node that filters said plurality of object variables based on a particular object type.

9. A system, comprising:
   a processor;
   a data bus coupled to said processor; and
   a computer-usable medium embodying computer code, said computer-usable medium being coupled to said data bus, said computer program code comprising instructions executable by said processor and configured for:
   instantiating a rule-based module comprising a plurality of rules utilizing a compiled domain model, wherein said rule-based module comprises an object-oriented representation of said compiled domain model;
   compiling a LHS of said rule-based module into at least one condition pattern utilizing a rule compiler wherein said condition pattern includes a transformer field, which comprises an integer array for recording the position of a plurality of object variables of said LHS within said condition pattern; and
   generating a tree structure by loading said compiled domain model and said at least one condition pattern associated with said rule-based module and propagating a plurality of tokens by asserting said plurality of object variables based on inheritance type hierarchy wherein said plurality of tokens end at a terminal node.

10. The system of claim 9 wherein said tree structure comprises a RETE tree.

11. The system of claim 9, wherein said instructions are further configured for:
   implementing said rule compiler utilizing an object oriented programming language; and
   arranging a position of said plurality of tokens utilizing said transformer field.

12. The system of claim 9 wherein said tree structure comprises a plurality of nodes arranged as a series of linked nodes.

13. The system of claim 9 wherein said instructions are further configured for permitting said rule compiler to compile an intermediate format of said rules-based module into a binary component utilized in a target object-oriented environment.

14. The system of claim 9 wherein said rule-based module is capable of being added and removed during run-time.

15. The system of claim 9 wherein said plurality of nodes comprises a type node, an alpha pattern node, a beta pattern node and said terminal node.

16. The system of claim 15 wherein said type node comprises a root node that filters said plurality of object variables based on a particular object type.

17. A non-transitory computer-usable medium embodying computer program code, said computer program code comprising computer executable instructions configured for:
    instantiating a rule-based module comprising a plurality of rules utilizing a compiled domain model, wherein said rule-based module comprises an object-oriented representation of said compiled domain model;
    compiling a LHS of said rule-based module into at least one condition pattern utilizing a rule compiler wherein said condition pattern includes a transformer field, which comprises an integer array for recording the position of a plurality of object variables of said LHS within said condition pattern; and
    generating a tree structure by loading said compiled domain model and said at least one condition pattern associated with said rule-based module and propagating a plurality of tokens by asserting said plurality of object variables based on inheritance type hierarchy wherein said plurality of tokens end at a terminal node.

18. The computer-usable medium of claim 17, wherein said tree structure comprises a RETE tree.

19. The computer-usable medium of claim 17, wherein said embodied computer program code further comprises computer executable instructions configured for:
    implementing said rule compiler utilizing an object oriented programming language; and
    arranging a position of said plurality of tokens utilizing said transformer field.

20. The computer-usable medium of claim 17, wherein said tree structure comprises a plurality of nodes arranged as a series of linked nodes.

* * * * *